United States Patent
West et al.

(10) Patent No.: US 11,939,526 B2
(45) Date of Patent: Mar. 26, 2024

(54) VENT STACK LIDS AND ASSOCIATED SYSTEMS AND METHODS

(71) Applicant: SUNCOKE TECHNOLOGY AND DEVELOPMENT LLC, Lisle, IL (US)

(72) Inventors: Gary Dean West, Lisle, IL (US); Chun Wai Choi, Lisle, IL (US); Thomas James Hirt, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 9 days.

(21) Appl. No.: 17/471,491

(22) Filed: Sep. 10, 2021

(65) Prior Publication Data
US 2022/0204858 A1 Jun. 30, 2022

Related U.S. Application Data

(63) Continuation of application No. 14/655,013, filed as application No. PCT/US2012/072174 on Dec. 28, 2012, now Pat. No. 11,142,699.

(51) Int. Cl.
*C10B 27/06* (2006.01)
*B23P 19/04* (2006.01)
(Continued)

(52) U.S. Cl.
CPC ............. *C10B 27/06* (2013.01); *B23P 19/04* (2013.01); *F16J 15/002* (2013.01); *F23J 13/08* (2013.01);
(Continued)

(58) Field of Classification Search
USPC ............................................ 202/254; 29/428
See application file for complete search history.

(56) References Cited

U.S. PATENT DOCUMENTS 425,797 A 4/1890 Hunt
469,868 A 3/1892 Osbourn
(Continued)

FOREIGN PATENT DOCUMENTS

CA 1172895 8/1984
CA 2775992 5/2011
(Continued)

OTHER PUBLICATIONS

U.S. Appl. No. 17/521,061, filed Nov. 8, 2021, Crum et al.
(Continued)

*Primary Examiner* — Dirk R Bass
(74) *Attorney, Agent, or Firm* — Perkins Coie LLP

(57) ABSTRACT

The present technology is generally directed to vent stack lids and associated systems and methods. In particular, several embodiments are directed to vent stack lids having improved sealing properties in a coke processing system. In a particular embodiment, a vent stack lid comprises a first lid portion proximate to and at least partially spaced apart from a second lid portion. The vent stack lid further comprises a first sealing portion coupled to the first lid portion and a second sealing portion coupled to the second lid portion. In several embodiments, the second sealing portion at least partially overlaps the first sealing portion over the space between the first and second lid portions. In further embodiments, at least one of the first or second sealing portions includes layers of tadpole seals, spring seals, rigid refractory material, and/or flexible refractory blanket.

19 Claims, 5 Drawing Sheets

(51) Int. Cl.
*F16J 15/00* (2006.01)
*F23J 13/08* (2006.01)
*F23L 13/00* (2006.01)
*C10B 15/02* (2006.01)
*C10B 21/10* (2006.01)

(52) U.S. Cl.
CPC .............. *F23L 13/00* (2013.01); *C10B 15/02* (2013.01); *C10B 21/10* (2013.01); *Y10T 29/49828* (2015.01)

(56) References Cited

U.S. PATENT DOCUMENTS

| | | | |
|---|---|---|---|
| 705,926 | A | 7/1902 | Hemingway |
| 760,372 | A | 5/1904 | Beam |
| 845,719 | A | 2/1907 | Schniewind |
| 875,989 | A | 1/1908 | Garner |
| 976,580 | A | 7/1909 | Krause |
| 1,140,798 | A | 5/1915 | Carpenter |
| 1,424,777 | A | 8/1922 | Schondeling |
| 1,430,027 | A | 9/1922 | Plantinga |
| 1,486,401 | A | 3/1924 | Van Ackeren |
| 1,530,995 | A | 3/1925 | Geiger |
| 1,572,391 | A | 2/1926 | Klaiber |
| 1,677,973 | A | 7/1928 | Marquard |
| 1,705,039 | A | 3/1929 | Thornhill |
| 1,721,813 | A | 7/1929 | Geipert |
| 1,757,682 | A | 5/1930 | Palm |
| 1,818,370 | A | 8/1931 | Wine |
| 1,818,994 | A | 8/1931 | Kreisinger |
| 1,830,951 | A | 11/1931 | Lovett |
| 1,848,818 | A | 3/1932 | Becker |
| 1,895,202 | A | 1/1933 | Montgomery |
| 1,947,499 | A | 2/1934 | Schrader et al. |
| 1,955,962 | A | 4/1934 | Jones |
| 1,979,507 | A | 11/1934 | Underwood |
| 2,075,337 | A | 3/1937 | Burnaugh |
| 2,141,035 | A | 12/1938 | Daniels |
| 2,195,466 | A | 4/1940 | Otto |
| 2,235,970 | A | 3/1941 | Wilputte |
| 2,340,283 | A | 1/1944 | Vladu |
| 2,340,981 | A | 2/1944 | Otto |
| 2,394,173 | A | 2/1946 | Harris et al. |
| 2,424,012 | A | 7/1947 | Bangham et al. |
| 2,486,199 | A | 10/1949 | Nier |
| 2,609,948 | A | 9/1952 | Laveley |
| 2,641,575 | A | 6/1953 | Otto |
| 2,649,978 | A | 8/1953 | Smith |
| 2,667,185 | A | 1/1954 | Beavers |
| 2,723,725 | A | 11/1955 | Keiffer |
| 2,756,842 | A | 7/1956 | Chamberlin et al. |
| 2,813,708 | A | 11/1957 | Frey |
| 2,827,424 | A | 3/1958 | Homan |
| 2,873,816 | A | 2/1959 | Emil et al. |
| 2,902,991 | A | 9/1959 | Whitman |
| 2,907,698 | A | 10/1959 | Schulz |
| 2,968,083 | A | 1/1961 | Lentz et al. |
| 3,015,893 | A | 1/1962 | McCreary |
| 3,026,715 | A | 3/1962 | Briggs |
| 3,033,764 | A | 5/1962 | Hannes |
| 3,175,961 | A | 3/1965 | Samson |
| 3,199,135 | A | 8/1965 | Trucker |
| 3,224,805 | A | 12/1965 | Clyatt |
| 3,259,551 | A | 7/1966 | Thompson, Jr. |
| 3,265,044 | A | 8/1966 | Juchtern |
| 3,267,913 | A | 8/1966 | Jakob |
| 3,327,521 | A | 6/1967 | Briggs |
| 3,342,990 | A | 9/1967 | Barrington et al. |
| 3,444,046 | A | 5/1969 | Harlow |
| 3,444,047 | A | 5/1969 | Wilde |
| 3,448,012 | A | 6/1969 | Allred |
| 3,453,839 | A | 7/1969 | Sabin |
| 3,462,345 | A | 8/1969 | Kernan |
| 3,511,030 | A | 5/1970 | Brown et al. |
| 3,542,650 | A | 11/1970 | Kulakov |
| 3,545,470 | A | 12/1970 | Paton |
| 3,587,198 | A | 6/1971 | Hensel |
| 3,591,827 | A | 7/1971 | Hall |
| 3,592,742 | A | 7/1971 | Thompson |
| 3,616,408 | A | 10/1971 | Hickam |
| 3,623,511 | A | 11/1971 | Levin |
| 3,630,852 | A | 12/1971 | Nashan et al. |
| 3,652,403 | A | 3/1972 | Knappstein et al. |
| 3,676,305 | A | 7/1972 | Cremer |
| 3,709,794 | A | 1/1973 | Kinzler et al. |
| 3,710,551 | A | 1/1973 | Sved |
| 3,746,626 | A | 7/1973 | Morrison, Jr. |
| 3,748,235 | A | 7/1973 | Pries |
| 3,784,034 | A | 1/1974 | Thompson |
| 3,806,032 | A | 4/1974 | Pries |
| 3,811,572 | A | 5/1974 | Tatterson |
| 3,836,161 | A | 10/1974 | Pries |
| 3,839,156 | A | 10/1974 | Jakobi et al. |
| 3,844,900 | A | 10/1974 | Schulte |
| 3,857,758 | A | 12/1974 | Mole |
| 3,875,016 | A | 4/1975 | Schmidt-Balve |
| 3,876,143 | A | 4/1975 | Rossow et al. |
| 3,876,506 | A | 4/1975 | Dix et al. |
| 3,878,053 | A | 4/1975 | Hyde |
| 3,894,302 | A | 7/1975 | Lasater |
| 3,897,312 | A | 7/1975 | Armour et al. |
| 3,906,992 | A | 9/1975 | Leach |
| 3,912,091 | A | 10/1975 | Thompson |
| 3,912,597 | A | 10/1975 | MacDonald |
| 3,917,458 | A | 11/1975 | Polak |
| 3,928,144 | A | 12/1975 | Jakimowicz |
| 3,930,961 | A | 1/1976 | Sustarsic et al. |
| 3,933,443 | A | 1/1976 | Lohrmann |
| 3,957,591 | A | 5/1976 | Riecker |
| 3,959,084 | A | 5/1976 | Price |
| 3,963,582 | A | 6/1976 | Helm et al. |
| 3,969,191 | A | 7/1976 | Bollenbach |
| 3,975,148 | A | 8/1976 | Fukuda et al. |
| 3,979,870 | A | 9/1976 | Moore |
| 3,984,289 | A | 10/1976 | Sustarsic et al. |
| 3,990,948 | A | 11/1976 | Lindgren |
| 4,004,702 | A | 1/1977 | Szendroi |
| 4,004,983 | A | 1/1977 | Pries |
| 4,025,395 | A | 5/1977 | Ekholm et al. |
| 4,040,910 | A | 8/1977 | Knappstein et al. |
| 4,045,056 | A | 8/1977 | Kandakov et al. |
| 4,045,299 | A | 8/1977 | McDonald |
| 4,059,885 | A | 11/1977 | Oldengott |
| 4,065,059 | A | 12/1977 | Jablin |
| 4,067,462 | A | 1/1978 | Thompson |
| 4,077,848 | A | 3/1978 | Grainer et al. |
| 4,083,753 | A | 4/1978 | Rogers et al. |
| 4,086,231 | A | 4/1978 | Ikio |
| 4,093,245 | A | 6/1978 | Connor |
| 4,100,033 | A | 7/1978 | Holter |
| 4,100,491 | A | 7/1978 | Newman, Jr. et al. |
| 4,100,889 | A | 7/1978 | Chayes |
| 4,111,757 | A | 9/1978 | Carimboli |
| 4,124,450 | A | 11/1978 | MacDonald |
| 4,133,720 | A | 1/1979 | Franzer et al. |
| 4,135,948 | A | 1/1979 | Mertens et al. |
| 4,141,796 | A | 2/1979 | Clark et al. |
| 4,143,104 | A | 3/1979 | van Konijnenburg et al. |
| 4,145,195 | A | 3/1979 | Knappstein et al. |
| 4,147,230 | A | 4/1979 | Ormond et al. |
| 4,162,546 | A | 7/1979 | Shortell et al. |
| 4,176,013 | A | 11/1979 | Garthus et al. |
| 4,181,459 | A | 1/1980 | Price |
| 4,189,272 | A | 2/1980 | Gregor et al. |
| 4,194,951 | A | 3/1980 | Pries |
| 4,196,053 | A | 4/1980 | Grohmann |
| 4,211,608 | A | 7/1980 | Kwasnoski et al. |
| 4,211,611 | A | 7/1980 | Bocsanczy |
| 4,213,489 | A | 7/1980 | Cain |
| 4,213,828 | A | 7/1980 | Calderon |
| 4,222,748 | A | 9/1980 | Argo et al. |
| 4,222,824 | A | 9/1980 | Flockenhaus et al. |
| 4,224,109 | A | 9/1980 | Flockenhaus et al. |
| 4,225,393 | A | 9/1980 | Gregor et al. |

(56) References Cited

U.S. PATENT DOCUMENTS

| | | |
|---|---|---|
| 4,226,113 A | 10/1980 | Pelletier et al. |
| 4,230,498 A | 10/1980 | Ruecki |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,298,497 A | 11/1981 | Colombo |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,316,435 A | 2/1982 | Nagamatsu et al. |
| 4,324,568 A | 4/1982 | Wilcox et al. |
| 4,330,372 A | 5/1982 | Cairns et al. |
| 4,334,963 A | 6/1982 | Stog |
| 4,336,107 A | 6/1982 | Irwin |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,385,962 A | 5/1983 | Stewen et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,406,619 A | 9/1983 | Oldengott |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A | 6/1988 | van Laar et al. |
| 4,793,981 A | 12/1988 | Doyle et al. |
| 4,821,473 A | 4/1989 | Cowell |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A | 1/1997 | Hippe et al. |
| 5,603,810 A | 2/1997 | Michler |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,705,037 A | 1/1998 | Reinke et al. |
| 5,715,962 A | 2/1998 | McDonnell |
| 5,720,855 A | 2/1998 | Baird |
| 5,745,969 A | 5/1998 | Yamada et al. |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,881,551 A | 3/1999 | Dang |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,003,706 A | 12/1999 | Rosen |
| 6,017,214 A | 1/2000 | Sturgulewski |
| 6,022,112 A | 2/2000 | Isler et al. |
| 6,059,932 A | 5/2000 | Sturgulewski |
| 6,126,910 A | 10/2000 | Wilhelm et al. |
| 6,139,692 A | 10/2000 | Tamura et al. |
| 6,152,668 A | 11/2000 | Knoch |
| 6,156,688 A | 12/2000 | Ando et al. |
| 6,173,679 B1 | 1/2001 | Bruckner et al. |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,495,268 B1 | 12/2002 | Harth, III et al. |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 | 3/2004 | Skarzenski et al. |
| 6,758,875 B2 | 7/2004 | Reid et al. |
| 6,786,941 B2 | 9/2004 | Reeves et al. |
| 6,830,660 B2 | 12/2004 | Yamauchi et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |

(56) References Cited

U.S. PATENT DOCUMENTS

| | | |
|---|---|---|
| 7,433,743 B2 | 10/2008 | Pistikopoulos et al. |
| 7,497,930 B2 | 3/2009 | Barkdoll et al. |
| 7,547,377 B2 | 6/2009 | Inamasu et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,172,930 B2 | 5/2012 | Barkdoll |
| 8,236,142 B2 | 8/2012 | Westbrook |
| 8,266,853 B2 | 9/2012 | Bloom et al. |
| 8,311,777 B2 | 11/2012 | Suguira et al. |
| 8,383,055 B2 | 2/2013 | Palmer |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2 | 10/2013 | Schuecker et al. |
| 8,640,635 B2 | 2/2014 | Bloom et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,169,439 B2 | 10/2015 | Sarpen et al. |
| 9,193,913 B2 | 11/2015 | Quanci et al. |
| 9,193,915 B2 | 11/2015 | West et al. |
| 9,200,225 B2 | 12/2015 | Barkdoll et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,273,250 B2 | 3/2016 | Choi et al. |
| 9,321,965 B2 | 4/2016 | Barkdoll |
| 9,359,554 B2 | 6/2016 | Quanci et al. |
| 9,404,043 B2 | 8/2016 | Kim |
| 9,463,980 B2 | 10/2016 | Fukada et al. |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,392,563 B2 | 8/2019 | Kim et al. |
| 10,435,042 B1 | 10/2019 | Weymouth |
| 10,526,541 B2 | 1/2020 | West et al. |
| 10,578,521 B1 | 3/2020 | Dinakaran et al. |
| 10,611,965 B2 | 4/2020 | Quanci et al. |
| 10,619,101 B2 | 4/2020 | Quanci et al. |
| 10,732,621 B2 | 8/2020 | Cella et al. |
| 10,877,007 B2 | 12/2020 | Steele et al. |
| 10,883,051 B2 | 1/2021 | Quanci et al. |
| 10,920,148 B2 | 2/2021 | Quanci et al. |
| 10,927,303 B2 | 2/2021 | Choi et al. |
| 10,947,455 B2 | 3/2021 | Quanci et al. |
| 10,968,393 B2 | 4/2021 | West et al. |
| 10,968,395 B2 | 4/2021 | Quanci et al. |
| 10,975,309 B2 | 4/2021 | Quanci et al. |
| 10,975,310 B2 | 4/2021 | Quanci et al. |
| 10,975,311 B2 | 4/2021 | Quanci et al. |
| 1,378,782 A1 | 5/2021 | Floyd |
| 11,008,517 B2 | 5/2021 | Chun et al. |
| 11,008,518 B2 | 5/2021 | Quanci |
| 11,021,655 B2 | 6/2021 | Quanci |
| 11,053,444 B2 | 7/2021 | Quanci et al. |
| 11,098,252 B2 | 8/2021 | Quanci |
| 11,117,087 B2 | 9/2021 | Quanci |
| 11,142,699 B2 | 10/2021 | West et al. |
| 1,429,346 A1 | 9/2022 | Horn |
| 2002/0170605 A1 | 11/2002 | Shiraishi et al. |
| 2003/0014954 A1 | 1/2003 | Ronning et al. |
| 2003/0015809 A1 | 1/2003 | Carsor |
| 2003/0057083 A1 | 3/2003 | Eatough et al. |
| 2004/0016377 A1 | 1/2004 | Johnson et al. |
| 2004/0220840 A1 | 11/2004 | Bonissone et al. |
| 2005/0087767 A1 | 4/2005 | Fitzgerald et al. |
| 2005/0096759 A1 | 5/2005 | Benjamin et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0105852 A1 | 4/2009 | Wintrich et al. |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1 | 1/2010 | Chun et al. |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0179421 A1 | 7/2012 | Dasgupta |
| 2012/0180133 A1 | 7/2012 | Ai-Harbi et al. |
| 2012/0195815 A1 | 8/2012 | Moore et al. |
| 2012/0228115 A1 | 9/2012 | Westbrook |
| 2012/0247939 A1 | 10/2012 | Kim et al. |

(56) References Cited

U.S. PATENT DOCUMENTS

| | | |
|---|---|---|
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0213114 A1 | 8/2013 | Wetzig et al. |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0156584 A1 | 6/2014 | Motukuri et al. |
| 2014/0182683 A1 | 7/2014 | Quanci et al. |
| 2014/0208997 A1 | 7/2014 | Alferyev et al. |
| 2014/0224123 A1 | 8/2014 | Walters |
| 2014/0262726 A1 | 9/2014 | West et al. |
| 2015/0041304 A1 | 2/2015 | Kiim et al. |
| 2015/0122629 A1 | 5/2015 | Freimuth et al. |
| 2015/0143908 A1 | 5/2015 | Cetinkaya |
| 2015/0175433 A1 | 6/2015 | Micka et al. |
| 2015/0219530 A1 | 8/2015 | Li et al. |
| 2015/0226499 A1 | 8/2015 | Mikkelsen |
| 2015/0361347 A1 | 12/2015 | Ball et al. |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0319198 A1 | 11/2016 | Quanci et al. |
| 2016/0370082 A1 | 12/2016 | Olivo |
| 2017/0173519 A1 | 6/2017 | Naito |
| 2017/0182447 A1 | 6/2017 | Sappok et al. |
| 2017/0183569 A1 | 6/2017 | Quanci et al. |
| 2017/0226425 A1 | 8/2017 | Kim et al. |
| 2017/0261417 A1 | 9/2017 | Zhang |
| 2017/0313943 A1 | 11/2017 | Valdevies |
| 2017/0352243 A1 | 12/2017 | Quanci et al. |
| 2018/0340122 A1 | 11/2018 | Crum et al. |
| 2019/0169503 A1 | 6/2019 | Chun et al. |
| 2019/0317167 A1 | 10/2019 | LaBorde et al. |
| 2020/0071190 A1 | 3/2020 | Wiederin et al. |
| 2020/0173273 A1 | 5/2020 | Badiei |
| 2020/0173679 A1 | 6/2020 | O'Reilly et al. |
| 2020/0206669 A1 | 7/2020 | Quanci |
| 2020/0206683 A1 | 7/2020 | Quanci |
| 2020/0208058 A1 | 7/2020 | Quanci |
| 2020/0208059 A1 | 7/2020 | Quanci |
| 2020/0208060 A1 | 7/2020 | Quanci |
| 2020/0208062 A1 | 7/2020 | Quanci |
| 2020/0208063 A1 | 7/2020 | Quanci |
| 2020/0208833 A1 | 7/2020 | Quanci |
| 2020/0231876 A1 | 7/2020 | Quanci et al. |
| 2020/0407641 A1 | 12/2020 | Quanci et al. |
| 2021/0024828 A1 | 1/2021 | Ball et al. |
| 2021/0032541 A1 | 2/2021 | Crum et al. |
| 2021/0040391 A1 | 2/2021 | Quanci et al. |
| 2021/0130697 A1 | 5/2021 | Quanci et al. |
| 2021/0163821 A1 | 6/2021 | Quanci et al. |
| 2021/0163822 A1 | 6/2021 | Quanci et al. |
| 2021/0163823 A1 | 6/2021 | Quanci et al. |
| 2021/0198579 A1 | 7/2021 | Quanci et al. |
| 2021/0261877 A1 | 8/2021 | Despen et al. |
| 2022/0298423 A1 | 9/2022 | Quanci et al. |
| 2022/0325183 A1 | 10/2022 | Quanci et al. |
| 2022/0356410 A1 | 11/2022 | Quanci et al. |
| 2023/0012031 A1 | 1/2023 | Quanci et al. |

FOREIGN PATENT DOCUMENTS

| | | |
|---|---|---|
| CA | 2822841 | 7/2012 |
| CA | 2822857 | 7/2012 |
| CA | 2905110 A1 | 9/2014 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 101211495 A | 7/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 202470353 U | 10/2012 |
| CN | 103399536 A | 11/2013 |
| CN | 103468289 A | 12/2013 |
| CN | 103913193 A | 7/2014 |
| CN | 203981700 U | 12/2014 |
| CN | 104498059 A | 4/2015 |
| CN | 105001914 A | 10/2015 |
| CN | 105137947 A | 12/2015 |
| CN | 105189704 A | 12/2015 |
| CN | 105264448 A | 1/2016 |
| CN | 105467949 A | 4/2016 |
| CN | 106661456 A | 5/2017 |
| CN | 106687564 A | 5/2017 |
| CN | 107445633 A | 12/2017 |
| CN | 100500619 C | 6/2020 |
| DE | 201729 C | 9/1908 |
| DE | 212176 | 7/1909 |
| DE | 1212037 B | 3/1966 |
| DE | 2212544 A | 1/1973 |
| DE | 2720688 A1 | 11/1978 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EA | 010510 B1 | 10/2008 |
| EP | 0126399 A1 | 11/1984 |
| EP | 0208490 A1 | 1/1987 |
| EP | 0903393 A2 | 3/1999 |
| EP | 1538503 A1 | 6/2005 |
| EP | 1860034 A1 | 11/2007 |
| EP | 2295129 A1 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |

(56) References Cited

FOREIGN PATENT DOCUMENTS

| | | |
|---|---|---|
| GB | 725865 | 3/1955 |
| GB | 871094 | 6/1961 |
| GB | 923205 A | 5/1963 |
| JP | S50148405 | 11/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | 07188668 | 7/1995 |
| JP | 07216357 | 8/1995 |
| JP | H07204432 | 8/1995 |
| JP | H0843314 A | 2/1996 |
| JP | H08104875 A | 4/1996 |
| JP | 08127778 | 5/1996 |
| JP | H08218071 A | 8/1996 |
| JP | H10273672 A | 10/1998 |
| JP | H11131074 | 5/1999 |
| JP | H11256166 A | 9/1999 |
| JP | 2000204373 A | 7/2000 |
| JP | 2000219883 A | 8/2000 |
| JP | 2001055576 A | 2/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003051082 A | 2/2003 |
| JP | 2003071313 A | 3/2003 |
| JP | 2003292968 A | 10/2003 |
| JP | 2003342581 A | 12/2003 |
| JP | 2004169016 A | 6/2004 |
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 3924064 B2 | 6/2007 |
| JP | 2007231326 A | 9/2007 |
| JP | 4101226 B2 | 6/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 | 7/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012102302 | 5/2012 |
| JP | 2012102325 A | 5/2012 |
| JP | 2013006957 A | 1/2013 |
| JP | 2013510910 | 3/2013 |
| JP | 2013189322 A | 9/2013 |
| JP | 2014040502 A | 3/2014 |
| JP | 2015094091 A | 5/2015 |
| JP | 2016169897 A | 9/2016 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 1020040020883 A | 3/2004 |
| KR | 20040107204 A | 12/2004 |
| KR | 20050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20150011084 A | 1/2015 |
| KR | 20170038102 A | 4/2017 |
| KR | 20170058808 A | 5/2017 |
| KR | 20170103857 A | 9/2017 |
| KR | 101862491 B1 | 5/2018 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2005023649 | 3/2005 |
| WO | WO2005031297 | 4/2005 |
| WO | WO2005115583 | 12/2005 |
| WO | WO2007103649 | 9/2007 |
| WO | WO2008034424 | 3/2008 |
| WO | WO2008105269 | 9/2008 |
| WO | WO2009147983 | 12/2009 |
| WO | WO2010103992 | 9/2010 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016086322 | 6/2016 |

OTHER PUBLICATIONS

U.S. Appl. No. 17/526,477, filed Nov. 15, 2021, Quanci et al.
U.S. Appl. No. 17/532,058, filed Nov. 22, 2021, Quanci et al.
U.S. Appl. No. 17/584,672, filed Jan. 26, 2022, Quanci et al.
U.S. Appl. No. 14/921,723, filed Oct. 23, 2015, titled Reduced Output Rate Coke Oven Operation With Gas Sharing Providing Extended Process Cycle.
U.S. Appl. No. 16/026,363, filed Jul. 3, 2018, titled Non-Perpendicular Connections Between Coke Oven Uptakes and a Hot Common Tunnel, and Associated Systems and Methods.
U.S. Appl. No. 13/843,166, now U.S. Pat. No. 9,273,250, filed Mar.

(56) References Cited

OTHER PUBLICATIONS 15, 2013, titled Methods and Systems for Improved Quench Tower Design.
U.S. Appl. No. 14/655,003, filed Jun. 23, 2015, titled Systems and Methods for Maintaining a Hot Car in a Coke Plant.
U.S. Appl. No. 16/897,957, filed Jun. 10, 2020, titled Systems and Methods for Maintaining a Hot Car in a Coke Plant.
U.S. Appl. No. 13/829,588, now U.S. Pat. No. 9,193,915, filed Mar. 14, 2013, titled Horizontal Heat Recovery Coke Ovens Having Monolith Crowns.
U.S. Appl. No. 16/704,689, filed Dec. 5, 2019, titled Horizontal Heat Recovery Coke Ovens Having Monolith Crowns.
U.S. Appl. No. 13/589,009, filed Aug. 17, 2012, titled Automatic Draft Control System for Coke Plants.
U.S. Appl. No. 17/176,391, filed Feb. 16, 2021, titled Automatic Draft Control System for Coke Plants.
U.S. Appl. No. 13/588,996, now U.S. Pat. No. 9,243,186, filed Aug. 17, 2012, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing, now U.S. Pat. No. 10,041,002.
U.S. Appl. No. 16/828,448, filed Mar. 24, 2020, titled Coke Plant Including Exhaust Gas Sharing.
U.S. Appl. No. 13/589,004, now U.S. Pat. No. 9,249,357, filed Aug. 17, 2012, titled Method and Apparatus for Volatile Matter Sharing in Stamp-Charged Coke Ovens.
U.S. Appl. No. 13/730,673, filed Dec. 28, 2012, titled Exhaust Flow Modifier, Duct Intersection Incorporating the Same, and Methods Therefor.
U.S. Appl. No. 17/191,119, filed March 3, 3021, titled Exhaust Flow Modifier, Duck Intersection Incorporating the Same, and Methods Therefor.
U.S. Appl. No. 13/598,394, now U.S. Pat. No. 9,169,439, filed Aug. 29, 2012, titled Method and Apparatus for Testing Coal Coking Properties.
U.S. Appl. No. 14/839,384, filed Aug. 28, 2015, titled Coke Oven Charging System.
U.S. Appl. No. 15/443,246, now U.S. Pat. No. 9,976,089, filed Feb. 27, 2017, titled Coke Oven Charging System.
U.S. Appl. No. 16/845,530, filed Apr. 10, 2020, titled Methods for Decarbonizing Coking Ovens, and Associated Systems and Devices.
U.S. Appl. No. 17/228,469, filed Apr. 12, 2021, titled Multi-Modal Beds of Coking Material.
U.S. Appl. No. 17/228,501, filed Apr. 12, 2021, titled Multi-Modal Beds of Coking Material.
U.S. Appl. No. 17/363,701, filed Jun. 30, 2021, titled Method and System for Optimizing Coke Plant Operation and Output.
U.S. Appl. No. 17/155,219, filed Jan. 22, 2021, titled Improved Burn Profiles for Coke Operations.
U.S. Appl. No. 16/735,103, filed Jan. 6, 2020, titled Method and System for Dynamically Charging a Coke Oven.
U.S. Appl. No. 15/614,525, filed Jun. 5, 2017, titled Methods and Systems for Automatically Generating a Remedial Action in an Industrial Facility.
U.S. Appl. No. 17/076,563, filed Oct. 21, 2020, titled System and Method for Repairing a Coke Oven.
U.S. Appl. No. 16/729,036, filed Dec. 27, 2019, titled Systems and Methods for Treating a Surface of a Coke Plant.
U.S. Appl. No. 16/729,122, filed Dec. 27, 2019, titled Methods and Systems for Providing Corrosion Resistant Surfaces in Contaminant Treatment Systems.
U.S. Appl. No. 16/729,068, filed Dec. 27, 2019, titled Systems and Methods for Utilizing Flue Gas.
U.S. Appl. No. 17/320,343, filed May 14, 2021, titled Coke Plant Tunnel Repair and Flexible Joints.
U.S. Appl. No. 16/729,170, filed Dec. 27, 2019, titled Coke Plant Tunnel Repair and Anchor Distribution.
U.S. Appl. No. 16/729,157, filed Dec. 27, 2019, titled Particulate Detection for Industrial Facilities, and Associated Systems and Methods.
U.S. Appl. No. 16/729,212, filed Dec. 27, 2019, now U.S. Pat. No. 11,021,655, titled Heat Recovery Oven Foundation.
U.S. Appl. No. 17/388,874, filed Jul. 29, 2021, titled Spring-Loaded Heat Recovery Oven System and Method.
U.S. Appl. No. 16/735,103, now U.S. Pat. No. 11,214,739, filed Jan. 6, 2020, titled Method and System for Dynamically Charging a Coke Oven.
U.S. Appl. No. 17/526,477, filed Jan. 6, 2020, titled Method and System for Dynamically Charging a Coke Oven.
U.S. Appl. No. 17/532,058, filed Nov. 22, 2021, titled Coke Plant Tunnel Repair and Anchor Distribution.
U.S. Appl. No. 17/843,164, filed Jun. 17, 2022, Quanci et al.
U.S. Appl. No. 17/947,520, filed Sep. 19, 2022, Quanci et al.
U.S. Appl. No. 17/967,615, filed Oct. 17, 2022, Quanci et al.
U.S. Appl. No. 18/047,916, filed Oct. 19, 2022, Quanci et al.
U.S. Appl. No. 18/052,739, filed Nov. 4, 2022, Quanci et al.
U.S. Appl. No. 18/052,760, filed Nov. 4, 2022, Quanci et al.
"High Alumina Cement-Manufacture, Characteristics and Uses," TheConstructor.org, https://theconstructor.org/concrete/high-alumina-cement/23686/; 12 pages.
"Refractory Castables," Victas.com, Dec. 28, 2011 (date obtained from WayBack Machine), https://www/vitcas.com/refactory-castables; 5 pages.
U.S. Appl. No. 07/587,742, filed Sep. 25, 1990, now U.S. Pat. No. 5,114,542, titled Nonrecovery Coke Oven Battery and Method of Operation.
U.S. Appl. No. 07/878,904, filed May 6, 1992, now U.S. Pat. No. 5,318,671, titled Method of Operation of Nonrecovery Coke Oven Battery.
U.S. Appl. No. 09/783,195, filed Feb. 14, 2001, now U.S. Pat. No. 6,596,128, titled Coke Oven Flue Gas Sharing.
U.S. Appl. No. 07/886,804, filed May 22, 1992, now U.S. Pat. No. 5,228,955, titled High Strength Coke Oven Wall Having Gas Flues Therein.
U.S. Appl. No. 08/059,673, filed May 12, 1993, now U.S. Pat. No. 5,447,606, titled Method of and Apparatus for Capturing Coke Oven Charging Emissions.
U.S. Appl. No. 08/914,140, filed Aug. 19, 1997, now U.S. Pat. No. 5,928,476, titled Nonrecovery Coke Oven Door.
U.S. Appl. No. 09/680,187, filed Oct. 5, 2000, now U.S. Pat. No. 6,290,494, titled Method and Apparatus for Coal Coking.
U.S. Appl. No. 10/933,866, filed Sep. 3, 2004, now U.S. Pat. No. 7,331,298, titled Coke Oven Rotary Wedge Door Latch.
U.S. Appl. No. 11/424,566, filed Jun. 16, 2006, now U.S. Pat. No. 7,497,930, titled Method and Apparatus for Compacting Coal for a Coal Coking Process.
U.S. Appl. No. 12/405,269, filed Mar. 17, 2009, now U.S. Pat. No. 7,998,316, titled Flat Push Coke Wet Quenching Apparatus and Process.
U.S. Appl. No. 13/205,960, filed Aug. 9, 2011, now U.S. Pat. No. 9,321,965, titled Flat Push Coke Wet Quenching Apparatus and Process.
U.S. Appl. No. 11/367,236, filed Mar. 3, 2006, now U.S. Pat. No. 8,152,970, titled Method and Apparatus for Producing Coke.
U.S. Appl. No. 12/403,391, filed Mar. 13, 2009, now U.S. Pat. No. 8,172,930, titled Cleanable in Situ Spark Arrestor.
U.S. Appl. No. 12/849,192, filed Aug. 3, 2010, now U.S. Pat. No. 9,200,225, titled Method and Apparatus for Compacting Coal for a Coal Coking Process.
U.S. Appl. No. 13/631,215, filed Sep. 28, 2012, now U.S. Pat. No. 9,683,740, titled Methods for Handling Coal Processing Emissions and Associated Systems and Devices.
U.S. Appl. No. 13/730,692, filed Dec. 28, 2012, now U.S. Pat. No. 9,193,913, titled Reduced Output Rate Coke Oven Operation With Gas Sharing Providing Extended Process Cycle.
U.S. Appl. No. 14/655,204, now U.S. Pat. No. 10,016,714, filed Jun. 24, 2015, titled Systems and Methods for Removing Mercury From Emissions.
U.S. Appl. No. 16/000,516, now U.S. Pat. No. 11,117,087, filed Jun. 5, 2018, titled Systems and Methods for Removing Mercury From Emissions.
U.S. Appl. No. 17/459,380, filed Jun. 5, 2018, titled Systems and Methods for Removing Mercury From Emissions.

(56) References Cited

OTHER PUBLICATIONS

U.S. Appl. No. 13/830,971, filed Mar. 14, 2013, now U.S. Pat. No. 10,047,296, titled Non-Perpendicular Connections Between Coke Oven Uptakes and a Hot Common Tunnel, and Associated Systems and Methods, now U.S. Pat. No. 10,047,295.
U.S. Appl. No. 16/026,363, filed Jul. 3, 2018, now U.S. Pat. No. 11,008,517, titled Non-Perpendicular Connections Between Coke Oven Uptakes and a Hot Common Tunnel, and Associated Systems and Methods.
U.S. Appl. No. 13/730,796, filed Dec. 28, 2012, now U.S. Pat. No. 10,883,051, titled Methods and Systems for Improved Coke Quenching.
U.S. Appl. No. 17/140,564, filed Jan. 4, 2021, titled Methods and Systems for Improved Coke Quenching.
U.S. Appl. No. 13/730,598, filed Dec. 28, 2012, now U.S. Pat. No. 9,238,778, titled Systems and Methods for Improving Quenched Coke Recovery.
U.S. Appl. No. 14/952,267, filed Nov. 25, 2015, now U.S. Pat. No. 9,862,888, titled Systems and Methods for Improving Quenched Coke Recovery.
U.S. Appl. No. 15/830,320, filed Dec. 4, 2017, now U.S. Pat. No. 10,323,192, titled Systems and Methods for Improving Quenched Coke Recovery.
U.S. Appl. No. 13/730,735, filed Dec. 28, 2012, now U.S. Pat. No. 9,273,249, titled Systems and Methods for Controlling Air Distribution in a Coke Oven.
U.S. Appl. No. 14/655,013, filed Jun. 23, 2015, now U.S. Pat. No. 11,142,699, titled Vent Stack Lids and Associated Systems and Methods.
U.S. Appl. No. 13/843,166, filed Mar. 15, 2013, now U.S. Pat. No. 9,273,250, titled Methods and Systems for Improved Quench Tower Design.
U.S. Appl. No. 15/014,547, filed Feb. 3, 2016, now, U.S. Pat. No. 10,927,303, titled Methods for Improved Quench Tower Design.
U.S. Appl. No. 17/155,818, filed Jan. 22, 2021, titled Methods and Systems for Improved Quench Tower Design.
U.S. Appl. No. 18/363,508, filed Aug. 1, 2023, titled Methods and Systems for Improved Quench Tower Design.
U.S. Appl. No. 14/655,003, filed Jun. 23, 2015, now U.S. Pat. No. 10,760,002, titled Systems and Methods for Maintaining a Hot Car in a Coke Plant.
U.S. Appl. No. 16/897,957, filed Jun. 10, 2020, now U.S. Pat. No. 11,359,145, titled Systems and Methods for Maintaining a Hot Car in a Coke Plant.
U.S. Appl. No. 13/829,588, filed Mar. 14, 2013, now U.S. Pat. No. 9,193,915, titled Horizontal Heat Recovery Coke Ovens Having Monolith Crowns.
U.S. Appl. No. 15/322,176, filed Dec. 27, 2016, now U.S. Pat. No. 10,526,541, titled Horizontal Heat Recovery Coke Ovens Having Monolith Crowns.
U.S. Appl. No. 15/511,036, filed Mar. 14, 2017, now U.S. Pat. No. 10,968,383, titled Coke Ovens Having Monolith Component Construction.
U.S. Appl. No. 17/190,720, filed Mar. 3, 2021, titled Coke Ovens Having Monolith Component Construction.
U.S. Appl. No. 13/589,009, filed Aug. 17, 2012, now U.S. Pat. No. 9,359,554, titled Automatic Draft Control System for Coke Plants.
U.S. Appl. No. 15/139,568, filed Apr. 27, 2016, now U.S. Pat. No. 10,947,455, titled Automatic Draft Control System for Coke Plants.
U.S. Appl. No. 17/176,391, now U.S. Pat. No. 11,692,138, filed Feb. 16, 2021, titled Automatic Draft Control System for Coke Plants.
U.S. Appl. No. 18/321,530, filed May 22, 2023, titled Automatic Draft Control System for Coke Plants.
U.S. Appl. No. 13/588,996, filed Aug. 17, 2012, now U.S. Pat. No. 9,243,186, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing.
U.S. Appl. No. 16/047,198, filed Jul. 27, 2018, now U.S. Pat. No. 10,611,965, titled Coke Plant Including Exhaust Gas Sharing.
U.S. Appl. No. 16/828,448, filed Mar. 24, 2020, now U.S. Pat. No. 11,441,077, titled Coke Plant Including Exhaust Gas Sharing.
U.S. Appl. No. 13/589,004, filed Aug. 17, 2012, now U.S. Pat. No. 9,249,357, titled Method and Apparatus for Volatile Matter Sharing in Stamp-Charged Coke Ovens.
U.S. Appl. No. 13/730,673, filed Dec. 28, 2012, now U.S. Pat. No. 9,476,547, titled Exhaust Flow Modifier, Duct Intersection Incorporating the Same, and Methods Therefor.
U.S. Appl. No. 15/281,891, filed Sep. 30, 2016, now U.S. Pat. No. 10,975,309, titled Exhaust Flow Modifier, Duct Intersection Incorporating the Same, and Methods Therefor.
U.S. Appl. No. 17/191,119, filed Mar. 3, 3021, titled Exhaust Flow Modifier, Duct Intersection Incorporating the Same, and Methods Therefor.
U.S. Appl. No. 13/598,394, filed Aug. 29, 2012, now U.S. Pat. No. 9,169,439, titled Method and Apparatus for Testing Coal Coking Properties.
U.S. Appl. No. 14/865,581, filed Sep. 25, 2015, now U.S. Pat. No. 10,053,627, titled Method and Apparatus for Testing Coal Coking Properties, now U.S. Pat. No. 10,053,627.
U.S. Appl. No. 14/839,384, filed Aug. 28, 2015, now U.S. Pat. No. 9,580,656, titled Coke Oven Charging System.
U.S. Appl. No. 15/443,246, filed Feb. 27, 2017, now U.S. Pat. No. 9,976,089, titled Coke Oven Charging System.
U.S. Appl. No. 14/587,670, filed Dec. 31, 2014, now U.S. Pat. No. 10,619,101, titled Methods for Decarbonizing Coking Ovens, and Associated Systems and Devices.
U.S. Appl. No. 16/845,530, filed Apr. 10, 2020, now U.S. Pat. No. 11,359,146, titled Methods for Decarbonizing Coking Ovens, and Associated Systems and Devices.
U.S. Appl. No. 14/984,489, filed Dec. 30, 2015, now U.S. Pat. No. 10,975,310, titled Multi-Modal Beds of Coking Material.
U.S. Appl. No. 14/983,837, filed Dec. 30, 2015, now U.S. Pat. No. 10,968,395, titled Multi-Modal Beds of Coking Material.
U.S. Appl. No. 14/986,281, filed Dec. 31, 2015, now U.S. Pat. No. 10,975,311, titled Multi-Modal Beds of Coking Material.
U.S. Appl. No. 17/222,886, filed Apr. 12, 2021, titled Multi-Modal Beds of Coking Material.
U.S. Appl. No. 14/987,625, filed Jan. 4, 2016, now U.S. Pat. No. 11,060,032, titled Integrated Coke Plant Automation and Optimization Using Advanced Control and Optimization Techniques.
U.S. Appl. No. 17/172,476, filed Feb. 10, 2021, titled Integrated Coke Plant Automation and Optimization Using Advanced Control and Optimization Techniques.
U.S. Appl. No. 14/839,493, filed Aug. 28, 2015, now U.S. Pat. No. 10,233,392, titled Method and System for Optimizing Coke Plant Operation and Output.
U.S. Appl. No. 16/251,352, filed Jan. 18, 2019, now U.S. Pat. No. 11,053,444, titled Method and System for Optimizing Coke Plant Operation and Output.
U.S. Appl. No. 14/839,551, filed Aug. 28, 2015, now U.S. Pat. No. 10,308,876, titled Burn Profiles for Coke Operations.
U.S. Appl. No. 16/428,014, filed May 31, 2019, now U.S. Pat. No. 10,920,148, titled Improved Burn Profiles for Coke Operations.
U.S. Appl. No. 17/155,719, filed Jan. 22, 2021, now U.S. Pat. No. 11,441,078, titled Improved Burn Profiles for Coke Operations.
U.S. Appl. No. 14/839,588, filed Aug. 28, 2015, now U.S. Pat. No. 9,708,542, titled Method and System for Optimizing Coke Plant Operation and Output.
U.S. Appl. No. 15/392,942, filed Dec. 28, 2016, now U.S. Pat. No. 10,526,542, titled Method and System for Dynamically Charging a Coke Oven.
U.S. Appl. No. 16/735,103, filed Jan. 6, 2020, now U.S. Pat. No. 11,214,739, titled Method and System for Dynamically Charging a Coke Oven.
U.S. Appl. No. 15/614,525, filed Jun. 5, 2017, now U.S. Pat. No. 11,508,230, titled Methods and Systems for Automatically Generating a Remedial Action in an Industrial Facility.
U.S. Appl. No. 18/047,916, filed Oct. 19, 2022, titled Methods and Systems for Automatically Generating a Remedial Action in an Industrial Facility.
U.S. Appl. No. 15/987,860, filed May 23, 2018, now U.S. Pat. No. 10,851,306, titled System and Method for Repairing a Coke Oven.

(56) References Cited

OTHER PUBLICATIONS

U.S. Appl. No. 17/076,563, filed Oct. 21, 2020, now U.S. Pat. No. 11,186,778, titled System and Method for Repairing a Coke Oven.
U.S. Appl. No. 17/521,061, filed Nov. 8, 2021, titled System and Method for Repairing a Coke Oven.
U.S. Appl. No. 17/135,483, filed Dec. 28, 2020, titled Oven Health Optimization Systems and Methods.
U.S. Appl. No. 16/729,053, filed Dec. 27, 2019, titled Oven Uptakes.
U.S. Appl. No. 18/366,244, filed Aug. 7, 2023, titled Oven Uptakes.
U.S. Appl. No. 16/729,036, filed Dec. 27, 2019, now U.S. Pat. No. 11,365,355, titled Systems and Methods for Treating a Surface of a Coke Plant.
U.S. Appl. No. 17/747,708, filed May 18, 2022, titled Systems and Methods for Treating a Surface of a Coke Plant.
U.S. Appl. No. 16/729,201, filed Dec. 27, 2019, titled Gaseous Tracer Leak Detection.
U.S. Appl. No. 16/729,122, filed Dec. 27, 2019, now U.S. Pat. No. 11,395,989, titled Methods and Systems for Providing Corrosion Resistant Surfaces in Contaminant Treatment Systems.
U.S. Appl. No. 17/843,164, filed Jun. 17, 2022, titled Methods and Systems for Providing Corrosion Resistant Surfaces in Contaminant Treatment Systems.
U.S. Appl. No. 16/729,068, filed Dec. 27, 2019, now U.S. Pat. No. 11,486,572, titled Systems and Methods for Utilizing Flue Gas.
U.S. Appl. No. 17/947,520, filed Sep. 19, 2022, titled Systems and Methods for Utilizing Flue Gas.
U.S. Appl. No. 16/729,129, filed Dec. 27, 2019, now U.S. Pat. No. 11,008,518, titled Coke Plant Tunnel Repair and Flexible Joints.
U.S. Appl. No. 17/320,343, filed May 14, 2021, now U.S. Pat. No. 11,597,881, titled Coke Plant Tunnel Repair and Flexible Joints.
U.S. Appl. No. 18/168,142, filed Feb. 13, 2023, titled Coke Plant Tunnel Repair and Flexible Joints.
U.S. Appl. No. 16/729,170, now U.S. Pat. No. 11,193,069, filed Dec. 27, 2019, titled Coke Plant Tunnel Repair and Anchor Distribution.
U.S. Appl. No. 17/532,058, now U.S. Pat. No. 11,505,747, filed Nov. 22, 2021, titled Coke Plant Tunnel Repair and Anchor Distribution.
U.S. Appl. No. 17/967,615, filed Oct. 17, 2022, titled Coke Plant Tunnel Repair and Anchor Distribution.
U.S. Appl. No. 16/729,157, filed Dec. 27, 2019, now U.S. Pat. No. 11,071,935, titled Particulate Detection for Industrial Facilities, and Associated Systems and Methods.
U.S. Appl. No. 16/729,057, filed Dec. 27, 2019, now U.S. Pat. No. 11,021,655, titled Decarbonization of Coke Ovens and Associated Systems and Methods.
U.S. Appl. No. 17/321,857, filed May 17, 2021, titled Decarbonization of Coke Ovens and Associated Systems and Methods.
U.S. Appl. No. 16/729,212, filed Dec. 27, 2019, now U.S. Pat. No. 11,261,381, titled Heat Recovery Oven Foundation.
U.S. Appl. No. 17/584,672, filed Jan. 26, 2022, titled Heat Recovery Oven Foundation.
U.S. Appl. No. 16/729,219, now U.S. Pat. No. 11,098,252, filed Dec. 27, 2019, titled Spring-Loaded Heat Recovery Oven System and Method.
U.S. Appl. No. 17/388,874, filed Jul. 29, 2021, now, U.S. Pat. No. 11,680,208, titled Spring-Loaded Heat Recovery Oven System and Method.
U.S. Appl. No. 18/313,647, filed May 8, 2023, titled Spring-Loaded Heat Recovery Oven System and Method.
U.S. Appl. No. 17/736,960, filed May 20, 2022, titled Foundry Coke Products, and Associated Systems and Methods.
U.S. Appl. No. 17/306,895, filed May 3, 2021, titled High-Quality Coke Products.
U.S. Appl. No. 18/363,465, filed Aug. 1, 2023, titled High-Quality Coke Products.
U.S. Appl. No. 18/052,739, filed Nov. 4, 2022, titled Foundry Coke Products and Associated Processing Methods Via Cupolas.
U.S. Appl. No. 18/052,760, filed Nov. 2, 2022, titled Foundry Coke Products, and Associated Systems, Devices, and Methods.
U.S. Appl. No. 17/155,818, filed Jan. 22, 2021, Choi et al.
U.S. Appl. No. 17/190,720, filed Mar. 3, 2021, West et al.
U.S. Appl. No. 17/191,119, filed Mar. 3, 2021, Quanci et al.
U.S. Appl. No. 17/222,886, filed Apr. 5, 2021, Quanci et al.
U.S. Appl. No. 17/228,469, filed Apr. 12, 2021, Quanci et al.
U.S. Appl. No. 17/228,501, filed Apr. 12, 2021, Quanci et al.
U.S. Appl. No. 17/306,895, filed May 3, 2021, Quanci et al.
U.S. Appl. No. 17/321,857 filed May 17, 2021, Quanci et al.
U.S. Appl. No. 17/320,343, filed May 24, 2021, Quanci et al.
U.S. Appl. No. 17/363,701, filed Jun. 30, 2021, Quanci et al.
U.S. Appl. No. 17/388,874, filed Jul. 29, 2021, Quanci et al.
U.S. Appl. No. 17/459,380, filed Aug. 27, 2021, Quanci et al.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Basset et al., "Calculation of steady flow pressure loss coefficients for pipe junctions, " Proc Instn Mech Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)— 34.7.4.6 Infrared and Thermal Cameras, Elsevier. Online version available at: https://app.knovel.com/hotlink/pdf/id:kt004QMGV6/instrumentation-reference-2/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.

(56) References Cited

OTHER PUBLICATIONS

"Middletown Coke Company HRSG Maintenance BACT Analysis Option 1—Individual Spray Quenches Sun Heat Recovery Coke Facility Process Flow Diagram Middletown Coke Company 100 Oven Case #1-24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.

Practical Technical Manual of Refractories, Baoyu Hu, etc., Beijing: Metallurgical Industry Press, Chapter 6; 2004, 6-30.

Refractories for Ironmaking and Steelmaking: A History of Battles over High Temperatures; Kyoshi Sugita (Japan, Shaolin Zhang), 1995, p. 160, 2004, 2-29.

Rose, Harold J., "The Selection of Coals for the Manufacture of Coke," American Institute of Mining and Metallurgical Engineers, Feb. 1926, 8 pages.

Waddell, et al., "Heat-Recovery Cokemaking Presentation," Jan. 1999, pp. 1-25.

Walker D N et al., "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.

Westbrook, "Heat-Recovery Cokemaking at Sun Coke," AISE Steel Technology, Pittsburg, PA, vol. 76, No. 1, Jan. 1999, pp. 25-28.

"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.

Yu et al., "Coke Oven Production Technology," Lianoning Science and Technology Press, first edition, Apr. 2014, pp. 356-358.

"Resources and Utilization of Coking Coal in China," Mingxin Shen ed., Chemical Industry Press, first edition, Jan. 2007, pp. 242-243, 247.

Canada Office Action for Canadian Application No. 2896478, dated Jul. 23, 2015, 5 pages.

Chinese Office Action in Chinese Application No. 201280077989.5, dated Jan. 26, 2016, 11 pages.

Extended European Search Report in European Application No. 12890975.1, dated Jul. 28, 2016; 6 pages.

Examination Report for European Application No. 12890975.1; dated Mar. 22, 2019; 4 pages.

India First Examination Report in Application No. 1737/KOLNP/2015; dated Dec. 20, 2018; 7 pages.

International Search Report and Written Opinion of International Application No. PCT/US2012/072174; dated Sep. 26, 2013; 10 pages.

U.S. Appl. No. 18/168,142, filed Feb. 13, 2023, Quanci et al.
U.S. Appl. No. 18/313,647, filed May 8, 2023, Quanci et al.
U.S. Appl. No. 18/321,530, filed May 22, 2023, Quanci et al.
U.S. Appl. No. 18/363,465, filed Aug. 1, 2023, Quanci et al.
U.S. Appl. No. 18/363,508, filed Aug. 1, 2023, Choi et al.
U.S. Appl. No. 18/366,244, filed Aug. 7, 2023, Quanci et al.

"Asbestos", Virginia Department of Health, https://www.vdh.virginia.gov/environmental-health/public-health-toxicology/asbestos/, updated 2023, 2 pages.

"Ceramic fibers woll—to 1,300° C.", gTeek, Dec. 29, 2017 (date obtained from google search tools), https://www.gteek.com/ceramic-fibers-woolp-to1-300-%C2%B0C, 15 pages.

De Cordova, et al. "Coke oven life prolongation—A multidisciplinary approach." 10.5151/2594-357X-2610 (2015) 12 pages.

"How Glass Is Made," Corning, https://www.corning.com/worldwide/en/innovation/materials-science/glass/how-glass-made.html, 2 pages.

Kusiorowski, et al., "Thermal decomposition of different types of asbestos," Journal of Thermal Analysis and Calorimetry • Feb. 2012, 109, 693-704 (2012).

Lin, Rongying et al., "Study on the synergistic effect of calcium and aluminum on improving ash fusion temperature of semi-coke," International Journal of Coal Preparation and Utilization, May 31, 2019 (published online), vol. 42, No. 3, pp. 556-564.

Lipunov, et al. "Diagnostics of the Heating Systgem and Lining of Coke Ovens," Coke and Chemistry, 2014, Vopl. 57, No. 12, pp. 489-492.

Tiwari, et al., "A novel technique for assessing the coking potential of coals/cole blends for non-recovery coke making process," Fuel, vol. 107, May 2013, pp. 615-622.

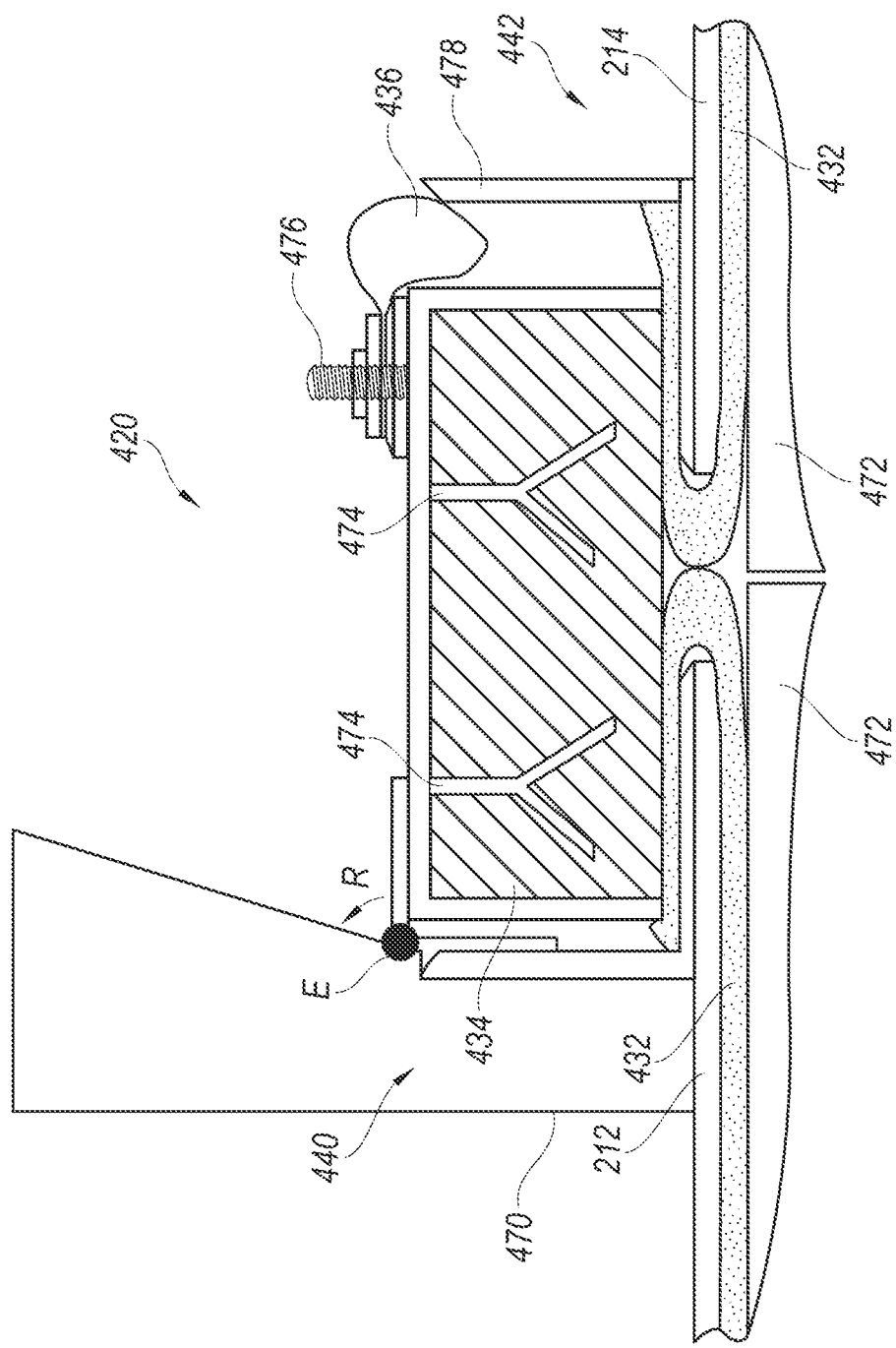

VENT STACK LIDS AND ASSOCIATED SYSTEMS AND METHODS

CROSS-REFERENCE TO RELATED APPLICATIONS

This application is a continuation of U.S. patent application Ser. No. 14/655,013, now U.S. Patent Application Publication No. 2015/0361346, filed on Jun. 23, 2015, which is a U.S. National Phase Entry of International Application No. PCT/US2012/072174, filed on Dec. 28, 2012, the disclosures of which are incorporated herein by reference in their entireties.

TECHNICAL FIELD

The present technology is generally directed to vent stack lids and associated systems and methods. In particular, several embodiments are directed to vent stack lids having improved sealing properties in a coke processing system.

BACKGROUND

Coke is a solid carbon fuel and carbon source used to melt and reduce iron ore in the production of steel. In one process, known as the "Thompson Coking Process," coke is produced by batch feeding pulverized coal to an oven that is sealed and heated to very high temperatures for 24 to 48 hours under closely-controlled atmospheric conditions. Coking ovens have been used for many years to convert coal into metallurgical coke. During the coking process, finely crushed coal is heated under controlled temperature conditions to devolatilize the coal and form a fused mass of coke having a predetermined porosity and strength.

The coke ovens create extremely hot exhaust gases, the gases sometimes reaching temperatures of 2,000 degrees Fahrenheit or hotter. Coke plants typically include vent stacks to expel these hot exhaust gases, either on a routine or emergency venting basis, or for maintenance purposes. The vent stacks can include stack lids intended to contain the exhaust in the stack when venting is undesirable, and also to keep atmospheric air from entering the negative-pressure coke processing environment. The vent stack lids typically include two side-by-side lid portions, each capable of opening in a clamshell configuration. However, over time, the side-by-side portions have a tendency to move slightly apart due to mechanical fatigue of the lid, the hinge/joint between the lid and the stack, or the stack itself. This creates a gap between the lid portions. The open gap can cause air in-leakage from the atmosphere into the stack to affect the process performance, and can leak exhaust gas into the outside environment at unintended times. Even if there is a seal on the lid, a small amount of fatigue movement of the lid portions releases enough hot gas that the seal can be quickly burned off. Accordingly, there exists a need to improve vent stack design to withstand high temperatures and stack lid shifting.

BRIEF DESCRIPTION OF THE DRAWINGS

FIG. 4 is a partially schematic illustration of a vent stack lid sealing system configured in accordance with further embodiments of the technology.

DETAILED DESCRIPTION

The present technology is generally directed to vent stack lids and associated systems and methods. In particular, several embodiments are directed to vent stack lids having improved sealing properties in a coke processing system. In a particular embodiment, a vent stack lid comprises a first lid portion proximate to and at least partially spaced apart from a second lid portion. The vent stack lid further comprises a first sealing portion coupled to the first lid portion and a second sealing portion coupled to the second lid portion. In several embodiments, the second sealing portion at least partially overlaps the first sealing portion over the space between the first and second lid portions. In further embodiments, at least one of the first or second sealing portions includes layers of tadpole seals, spring seals, rigid refractory material, and/or flexible refractory blanket.

Specific details of several embodiments of the technology are described below with reference to FIGS. 1-5B. Other details describing well-known structures and systems often associated with coal processing and coke ovens have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-5B.

Figure 1:
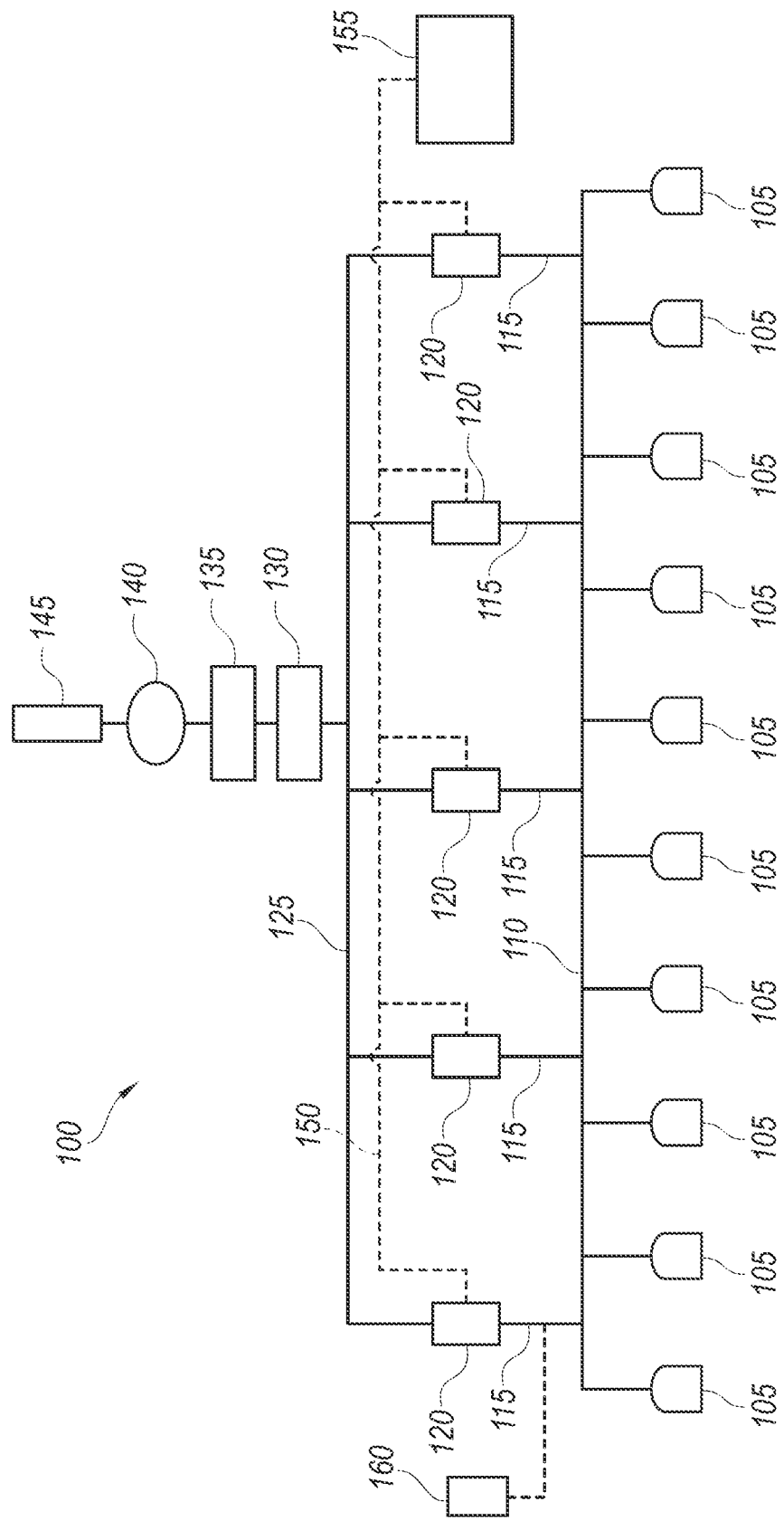
FIG. 1 is a schematic illustration of a horizontal heat recovery coke plant, configured in accordance with embodiments of the technology.

FIG. 1 is a schematic illustration of a horizontal heat recovery (HHR) coke plant 100, configured in accordance with embodiments of the technology. The HHR coke plant 100 comprises ovens 105, along with heat recovery steam generators (HRSGs) 120 and an air quality control system 130 (e.g., an exhaust or flue gas desulfurization (FGD) system), both of which are positioned fluidly downstream from the ovens 105 and both of which are fluidly connected to the ovens 105 by suitable ducts. The HHR coke plant 100 also includes a common tunnel 110 fluidly connecting individual ovens 105 to the HRSGs 120. One or more crossover ducts 115 fluidly connect the common tunnel 110 to the HRSGs 120. A cooled gas duct 125 transports the cooled gas from the HRSGs to the flue gas desulfurization (FGD) system 130. Fluidly connected and further downstream are a baghouse 135 for collecting particulates, at least one draft fan 140 for controlling air pressure within the system, and a main gas stack 145 for exhausting cooled, treated exhaust to the environment. Steam lines 150 can interconnect the HRSG 120 and a cogeneration plant 155 so that the recovered heat can be utilized. Various coke plants 100 can have different proportions of ovens 105, HRSGs 120, and other structures.

The plant 100 can further include a vent stack 160 fluidly connected to the common tunnel 110 and configured as an optional route to vent combusted flue gas to the atmosphere. For example, the exhaust gases can be routed to the vent stack 160 as a bypass option when the HRSGs 120 or downstream equipment is malfunctioning or undergoing maintenance. In further embodiments, the vent stack 160 can be positioned further downstream in the plant 100 or there can be multiple vent stacks 160. As will be discussed in further detail below with reference to FIGS. 2-5B, the vent stack 160 can include a vent stack lid configured to contain the exhaust gas in the vent stack 160 and prevent air in-leakage when venting is undesirable.

Figure 2:
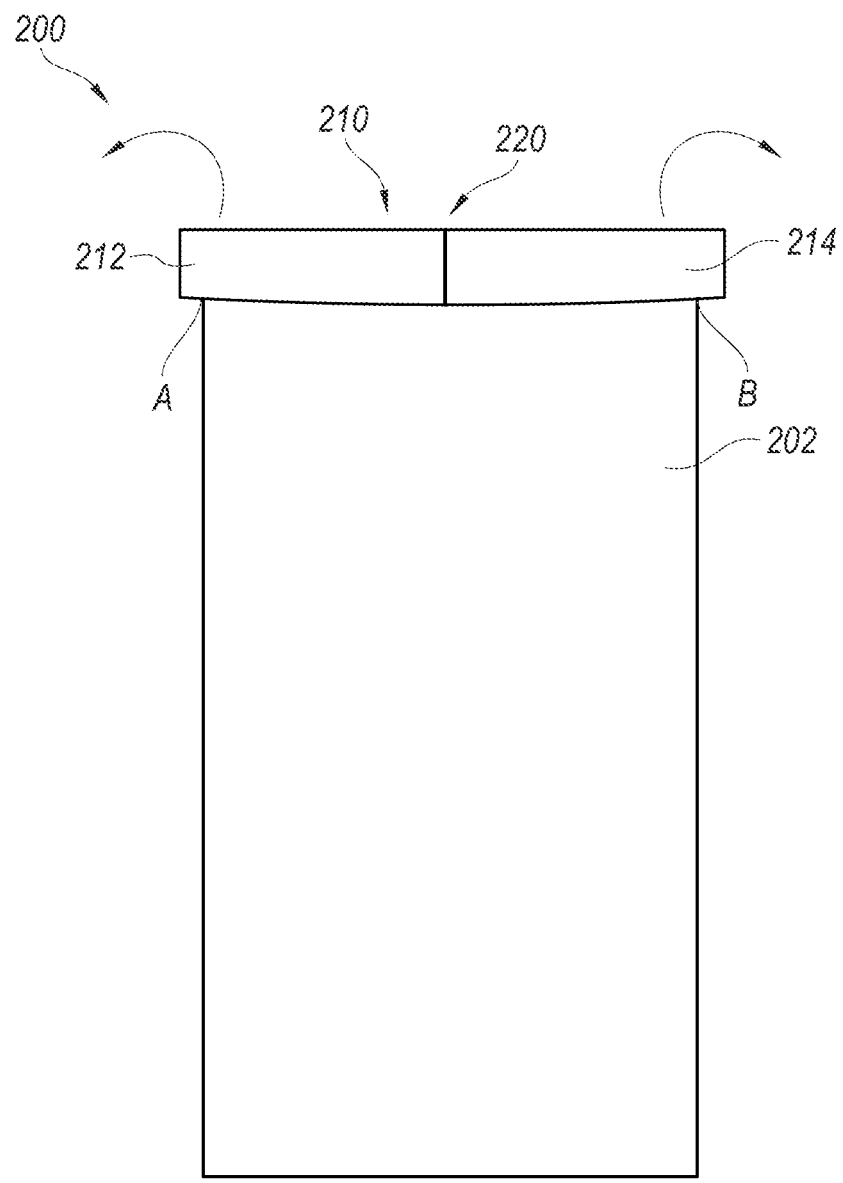
FIG. 2 is a partially schematic illustration of a vent stack system configured in accordance with embodiments of the technology.

FIG. 2 is a partially schematic illustration of a vent stack system 200 configured in accordance with embodiments of the technology. The vent stack system 200 can comprise a vent stack 202 and a vent stack lid 210. The vent stack lid 210 can include multiple lid portions, such as a first lid portion 212 that meets with a second lid portion 214 over the vent stack 202. In some embodiments, the first lid portion 212 and second lid portion 214 have a clamshell configuration and can open in the direction of the arrowed lines by pivoting at points A and B with the use of an actuator and/or a counterweight (not shown). In further embodiments, the first and second lid portions 212, 214 can open via a sliding motion or other suitable movement. The first and second lid portions 212, 214 can meet or nearly meet at a junction region having a vent stack sealing system 220. In some cases, there is a gap of approximately two inches between the first and second lid portions 212, 214. The gap can be larger or smaller in other situations, or can increase over the lifetime of the equipment due to mechanical fatigue. As will be described in further detail below with reference to FIGS. 3-5B, the sealing system 220 at the junction region can include overlapping seals and/or a plurality of layers of seals to contain hot exhaust gas in the vent stack 202.

Figure 3:
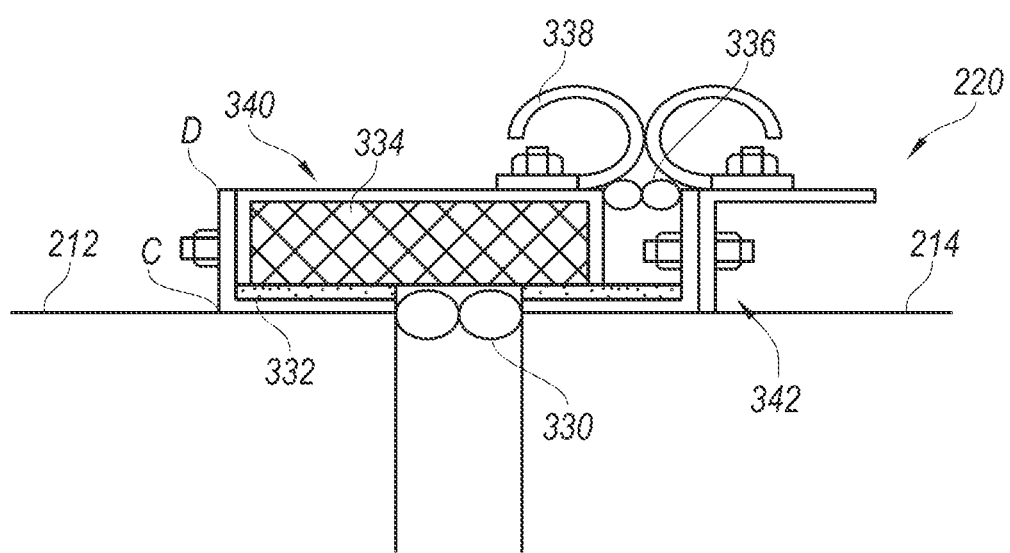
FIG. 3 is a partially schematic illustration of a vent stack lid sealing system configured in accordance with embodiments of the technology.

FIG. 3 is a partially schematic illustration of the vent stack lid sealing system 220 configured in accordance with embodiments of the technology. As discussed above, the sealing system 220 closes the gap between the first lid portion 212 and the second lid portion 214 and can extend across the top and/or down the sides of the lid portions 212, 214. In the illustrated embodiment, the sealing system 220 includes a first sealing portion 340 coupled to the first lid portion 212 and a second sealing portion 342 coupled to the second lid portion 214. In several embodiments, the first lid portion 212 and/or second sealing portion 342 comprises layers of different materials having different material properties. For example, the materials can be rigid, flexible, hard, soft, permeable, and/or impermeable, or any combination of these qualities. In a particular embodiment, a layer of rigid steel or refractory can be combined with a layer of more flexible refractory. In some embodiments, the first and/or second sealing portions 340, 342 comprise a generally rigid framework, comprising ceramic, stainless steel, refractory, and/or other material suitable for the environmental conditions at the vent stack lid. As will be described in further detail below, at least a section of the sealing portions 340, 342 is generally soft or flexible. While in the illustrated embodiment the first sealing portion 340 is generally rectangular shaped and the second sealing portion 342 is generally Z-shaped, the first and/or second sealing portions 340 can have other complementary shapes (e.g., blocks, channels, etc.) in other embodiments of the technology.

Each of the first and second sealing portions 340, 342 can include a tadpole seal 330 positioned in the gap between the first lid portion 212 and second lid portion 214. The tadpole seals 330 can be adjacent to one another and substantially fill the gap. The tadpole seals 330 can b e a high-temperature resistant material, such as ceramic rope. In further embodiments, only one of the first or second sealing portions 340, 342 includes a tadpole seal 330, or the tadpole seals 330 can be absent altogether. The seals 330 can be larger or smaller as necessary to substantially fill the gap, and need not be the same size. In further embodiments, the seals 330 can be stacked vertically rather than positioned side-by-side.

The sealing system 220 can further include a blanket layer 332 on each of the first sealing portion 340 and the second sealing portion 342. The blanket layer 332 can be a high-temperature-resistant material and can be generally soft or flexible, such as a thermal ceramic refractory blanket like Kaowool. In some embodiments, the blanket 332 or another soft or flexible material sits directly atop the vent stack 202 (shown in FIG. 2). In further embodiments, the blanket 332 can be positioned under the first and second lid portions 212, 214, and on or in the vent stack 202. The soft/hard interface between the soft blanket 332 and the vent stack lip can further reduce leaks because the soft material is able to conform to the rigid shape of the vent stack lip.

The first sealing portion 340 can further include a refractory material 334 above the blanket 332 and tadpole seal 330. The refractory material 334 overlaps the blanket layer 332 on the second sealing portion 342. This overlapping feature can provide further insurance against vent stack leaks. The degree of overlap can be varied in different embodiments of the disclosure. For example, the sealing system 220 can range from no overlap to overlap that spans nearly the entire width of the vent stack lid. As will be discussed in further detail with reference to FIGS. 5A and 5B, in some cases the side sections of the lid portions 212, 214 (or the sealing system 220 on the side portions) can overlap. In still further embodiments, there can be multiple layers of overlaps in the sealing system 220. As described above, the generally hard refractory material 334 adjacent to the generally soft blanket 332 can provide a more conforming seal and can further inhibit misalignment of the first and second lid portions 212, 214.

The first and second sealing portions 340, 342 can further include another layer of tadpole seals 336. The tadpole seals 336 can be adjacent to or above the refractory material 334 and can be the same or different size from the tadpole seals 330. The tadpole seals 336 can be ceramic rope or other similar material. In some embodiments, in addition to or in place of the tadpole seals 336, the sealing system 220 can include an additional overlap region of the first sealing portion 340 and second sealing portion 342, similar to the overlap described above. Above the tadpole seals 336, the first and second sealing portions 340, 342 can each include a spring seal 338. The spring seals 338 can be curved metal (e.g., stainless steel or other suitable material) and can press against one another to provide additional gap closure. In further embodiments, the spring seals 338 need not be curved, but can instead be plates or other shapes. While the tadpole seals 330, 336 and spring seals 338 are illustrated as pairs of side-by-side contact seals, in further embodiments these seals need not come in pairs. For example, in further embodiments, a single tadpole seal can fill the gap between the lid portions 212, 214 or a single metal spring seal or plate can be used alone. The various layers of sealing features can insulate the spring seals 338 from burning from exhaust heat.

In further embodiments, the sealing system 220 can have only a portion of the illustrated sealing features and/or there can be multiple layers of individual sealing features (e.g., more layers refractory 334 or blanket 332). Further, the various layers of sealing features can be present in a different order than illustrated. Additionally, while some sealing features (e.g., the refractory 334) are illustrated on only the first sealing portion 340, these features can additionally or alternately be located on the second sealing portion 342. Further, the first sealing portion 340 and second sealing portion 342 can overlap to a greater or lesser degree or can not overlap at all. For example, in a particular embodiment, the tadpole seals 330 and spring seals 338 can be positioned directly over the gap between the first and second lid portions 212, 214. Such a design can be used with or without other sealing elements (e.g., the refractory 334, blanket 332, and the associated overlap region) of the illustrated sealing system 220. In still further embodiments, additional types of seals, valves, lids, or other mechanisms known in the art can be used as part of the sealing system 220.

The first and second sealing portions 340, 342 can move with the first lid portion 212 and second lid portion 214, respectively, and/or can be capable of further hinged or sliding movement. In several embodiments, the first lid portion 212 and/or second lid portion 214 can open and/or close independently, and without requiring that the opposite lid portion be open. In other words, the first lid portion 212 and first sealing portion 340 can open without requiring that the second lid portion 214 and second sealing portion 342 be open, and vice versa. In some embodiments, the first sealing portion 340 can be movable relative to the first lid portion 212. For example, the first sealing portion 340 can hinge or pivot (e.g., at points C or D). The second sealing portion 342 can pivot at similar locations. In some cases, one or both sealing portions 340, 342 can pivot with the use of an actuator and/or a controller. In further embodiments, the first and/or second sealing portions 340, 342 can be slidably coupled to the first and second lid portions 212, 214, respectively, such that the sealing portions 340, 342 can slide away from one another when the lid portions 212, 214 are opening/closing. The first and second sealing portions 340, 342 can accordingly open and close independently without causing damage to the sealing portions 340, 342. In some embodiments, the sealing portions 340, 342 and/or the lid portions 212, 214 can lock in place. In still further embodiments, the entire sealing system 220 is coupled to only one of the first or second lid portions 212, 214, and can optionally make use of the pivot or sliding movement described above during opening and closing.

FIG. 4 is a partially schematic illustration of a vent stack lid sealing system 420 configured in accordance with further embodiments of the technology. The sealing system 420 can include several features generally similar to the sealing system 220 described above. For example, the sealing system 420 can include multiple layers of different materials having different material properties. For example, the materials can be rigid, flexible, hard, soft, permeable, and/or impermeable, or any combination of these qualities. These layers can stack and/or overlap to provide improved sealing and prevent gases from traversing the sealing system 420.

In the illustrated embodiment, the sealing system 420 includes a first sealing portion 440 coupled to the first lid portion 212 and a second sealing portion 442 coupled to the second lid portion 214. Each the first sealing portion 440 and the second sealing portion 442 includes a blanket layer 432 positioned on the first lid portion 212 and second lid portion 214, respectively. The blanket layer 432 can comprise a generally soft or flexible refractory or other insulating fiber material. In some embodiments, the blanket layer 432 can extend or wrap around the first and second lid portions 212, 214. The blanket layers 432 on the respective first and second sealing portions 440, 442 can meet as they wrap around the first and second lid portions 212, 214 and contact each other in the gap between the first and second lid portions 212, 214. The blanket layers 432 can thereby inhibit gas flow in and out of the vent stack. The blanket layer 432 can comprise any high-temperature-resistant material, such as ceramic refractory blanket, and can prevent the first and second lid portions 212, 214 from burning. In further embodiments, the blanket layer 432 need not wrap around the first and second lid portions 212, 214, or there can be a single piece (e.g., a sheet) of blanket layer 432 covering the space between the first and second lid portions 212, 214. In some embodiments, the sealing system 420 further includes an insulation layer 472 in or on the vent stack and positioned at least partially under the blanket layer 432 and the first and second lid portions 212, 214. The insulation layer 472 can comprise a single piece or multiple pieces (e.g., multiple pieces each individually attached to the first or second lid portion 212, 214). The insulation layer 472 can comprise a fiber module or other suitable material that can insulate the blanket layer 472 and lid portions 212, 214 from excessive heat from exhaust gas.

The sealing system 420 can further include generally rigid, castable refractory material 434 positioned above the blanket layer 432 and the first and second lid portions 212, 214. In the illustrated embodiment, the refractory material 434 can be coupled to the first sealing portion 440, but can additionally or alternately be coupled to the second sealing portion 442. In some embodiments, the refractory material 434 is cast around one or more reinforcing structures 474 or tensioning devices. While the reinforcing structures 474 are shown as Y-shaped, in further embodiments the structures 474 can be other shapes or can be absent altogether.

The refractory material 434 overlaps the blanket layer 432 on the second sealing portion 442. This overlapping feature can provide further insurance against vent stack leaks. The degree of overlap can be varied in different embodiments of the technology. For example, the sealing system 420 can range from no overlap to overlap that spans nearly the entire width of the vent stack lid, and in some cases the side sections of the lid portions 212, 214 can overlap. As described above, the generally hard refractory material 434 adjacent to the generally soft blanket 432 can provide a more conforming seal and can further inhibit misalignment of the first and second lid portions 212, 214.

A tadpole seal 436 can further inhibit air transfer in and out of the vent stack. The illustrated tadpole seal 436 is attached to the first sealing portion 440 via a fastener 476. The tadpole seal fills a space between the first sealing portion 440 and second sealing portion 442 (e.g., between the refractory 434 on the first sealing portion 440 and a vertical extension portion 478 of the second sealing portion 442). In further embodiments, there can be more or fewer tadpole seals 436, attached by other types of fasteners or friction fit.

One or both of the first or second sealing portions 440, 442 can be movable relative to one another or the vent stack lid portions 212, 214. For example, in the illustrated embodiment, the first sealing portion 440 is pivotably movable around hinge point E in the direction of rotation R. The hinge can be coupled to the first lid portion 212, refractory 434, or other portion of the first sealing portion 440, and can allow the first sealing portion 440 to pivot toward a pivot support 470. In further embodiments, the second sealing portion 442 can likewise move relative to the first and second lid portions 212, 214 or to the first sealing portion 440. For example, the first and/or second sealing portions 440, 442 can be independently movable such that one or either side can open and/or close without the other side having to move. In other embodiments, one lid portion 212 or 214 must be closed in order for the other to close. In further embodiments, the first and second lid portions 212, 214 or the first and second sealing portions 440, 442 can be configured for sliding movement, such as horizontal sliding movement or a combination of hinged and sliding movement. In other embodiments, the first and second lid portions 212 are configured for sliding movement while the first and/or second lid portions 212, 214 are angled relative to a horizontal plane.

In further embodiments, the sealing system 420 can have only a portion of the illustrated sealing features and/or there can be multiple layers of individual sealing features (e.g., more layers refractory 434 or blanket 432). Further, the various layers of sealing features can b e present in a different order than illustrated. Additionally, while some sealing features (e.g., the refractory 434) are illustrated on only the first sealing portion 440, these features can additionally or alternately be located on the second sealing portion 442. Further, the first sealing portion 440 and second sealing portion 442 can overlap to a greater or lesser degree or can not overlap at all. In still further embodiments, additional types of seals, valves, lids, or other mechanisms known in the art can be used as part of the sealing system 420.

Figure 5A:
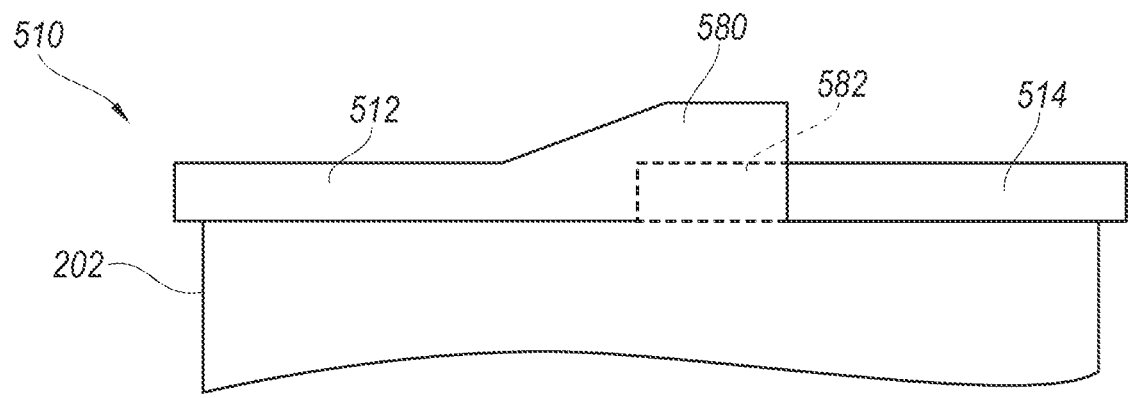
FIG. 5A is a side view of a vent stack lid configured in accordance with embodiments of the technology.
Figure 5B:
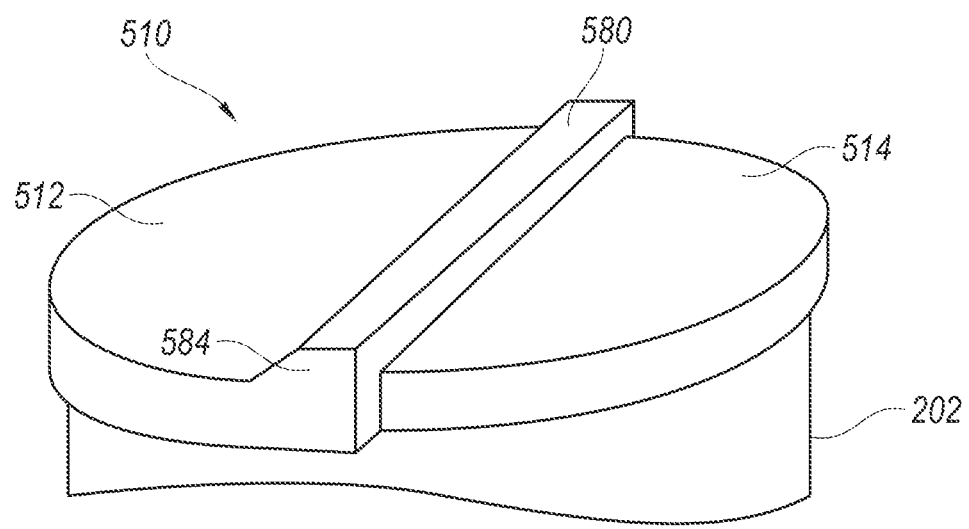
FIG. 5B is an isometric view of the vent stack lid of FIG. 5A configured in accordance with embodiments of the technology.

FIG. 5A is a side view of a vent stack lid 510 configured in accordance with embodiments of the technology. FIG. 5B is an isometric view of the vent stack lid 510. Referring to FIGS. 5A and 5B together, the lid 510 comprises a first lid portion 512 at least partially overlapping a second lid portion 514. In this sense, the sealing system is integral to the lid 510. The first lid portion 512 overlaps the second lid portion 514 at region 582. In further embodiments, the overlap region 582 can be larger or smaller. In the illustrated embodiment, the first lid portion 512 includes a rise at region 580 over the overlap region 582, but in further embodiments the upper surfaces of the first and second lid portions 512, 514 can be coplanar. The first lid portion 512 can further comprise an upside-down U-shape that can overlap or seal side portions of the second lid portion. For example, side region 584 of the first lid portion covers or overlaps a side portion of the second lid portion 514. In further embodiments, the first and second lid portions 512, 514 can have other complementary shapes.

The first and/or second lid portions 512, 514 can be pivotably coupled (i.e., with a hinge) to the vent stack 202. In further embodiments, the lid portions 512, 514 are slideably coupled or otherwise movable relative to the vent stack 202. The first and second lid portions 512, 514 can be cast refractory, steel, ceramic, or any other suitable material. The first and/or second lid portions 512, 514 can further include any materials or combinations of flexible, soft, rigid, hard, permeable, or impermeable materials described above. For example, in a particular embodiment, the first lid portion 512 further includes a soft or flexible insulating layer covering at least part of the overlap region 582 to further enhance the seal. In still further embodiments, any of the materials described above can be positioned under the first and second lid portions 512, 514, and on the vent stack 202 to further improve sealing. In other embodiments, other surfaces of the vent stack 202 can have additional sealing features (e.g., a blanket lining on an exterior or interior surface of the vent stack 202) to improve insulation or sealing.

EXAMPLES

1. A vent stack lid, comprising:
   a first lid portion proximate to and at least partially spaced apart from a second lid portion;
   a first sealing portion coupled to the first lid portion; and
   a second sealing portion coupled to the second lid portion, wherein the second sealing portion at least partially overlaps the first sealing portion over the space between the first and second lid portions.
2. The vent stack lid of example 1 wherein the first sealing portion comprises a first tadpole seal and the second sealing portion comprises a second tadpole seal, and wherein the first tadpole seal and second tadpole seal are in adjacent contact and are substantially positioned in the space between the first and second lid portions.
3. The vent stack lid of example 1 wherein the first sealing portion comprises a first spring seal and the second sealing portion comprises a second spring seal, and wherein the first spring seal and second spring seal are in adjacent contact and are positioned above the space between the first and second lid portions.
4. The vent stack lid of example 3 wherein the first spring seal and second spring seal are laterally offset from the space between the first lid portion and second lid portion.
5. The vent stack lid of example 1 wherein at least one of the first sealing portion or second sealing portion comprises a generally flexible, heat-resistant blanket.
6. The vent stack lid of example 1 wherein at least one of the first sealing portion or second sealing portion comprises a generally rigid refractory material.
7. The vent stack lid of example 1 wherein the first lid portion and the second lid portion are individually pivotably movable between a closed configuration and an open configuration.
8. The vent stack lid of example 1 wherein the second sealing portion is pivotably or slidably coupled to the second lid portion.
9. The vent stack lid of example 1 wherein at least one of the first sealing portion and second sealing portion comprise a generally rigid framework made of stainless steel, ceramic, or refractory material.
10. A vent stack system, comprising:
    a lid comprising a first lid portion at least partially spaced apart from a second lid portion; and
    a sealing system coupled to at least one of the first lid portion or the second lid portion and at least partially positioned in or over the space between the first lid portion and the second lid portion, the sealing system comprising a plurality of layers of materials, wherein at least two individual layers have different rigidity, hardness, or permeability properties from one another.
11. The vent stack system of example 10 wherein at least two layers overlap the space between the first lid portion and the second lid portion.
12. The vent stack system of example 10 wherein at least one layer comprises a tadpole seal, a spring seal, cast refractory, or a thermal blanket.
13. The vent stack system of example 10 wherein the plurality of layers comprises a generally flexible material adjacent to a generally rigid material.
14. The vent stack system of example 10 wherein the sealing system comprises a fastener configured to allow pivoting or sliding movement of at least a portion of the sealing system relative to the first lid portion.

15. A method of sealing a vent stack, the method comprising:
   positioning a generally flexible, heat-resistant material in or proximate to a space between a first vent stack lid portion and a second vent stack lid portion;
   positioning a generally rigid, heat-resistant material adjacent to the generally flexible material; and
   inhibiting gas from traversing the space between the first lid portion and the second lid portion.

16. The method of example 15 wherein the first lid portion comprises a top portion and a sidewall portion, and wherein positioning the generally flexible, heat-resistant material comprises positioning the generally flexible, heat-resistant material along at least one of the top portion or the sidewall portion.

17. The method of example 15, further comprising positioning a plurality of tadpole seals in the space between the first lid portion and the second lid portion.

18. The method of example 17, further comprising overlapping the tadpole seals with at least one of the generally flexible, heat resistant material or the generally rigid, heat-resistant material.

19. The method of example 15 wherein positioning the generally flexible, heat-resistant material comprises pivoting or sliding the material into the space between the first vent stack lid portion and the second vent stack lid portion.

20. The method of example 15, further comprising positioning a plurality of spring seals above the space between the first vent stack lid portion and the second vent stack lid portion.

The systems and methods disclosed herein offer several advantages over traditional coke oven systems. The sealing systems can provide more reliable containment of exhaust gas in the vent stack and can prevent atmospheric air from entering the stack. The sealing systems can provide several thermal-resistant seal layers to provide a tighter seal as compared to traditional systems. Since the sealing structures include several layers of high-temperature-resistant materials, the sealing features can last longer than traditional seals without burning off. Longer lasting seals accordingly require less maintenance which can lower operation costs and increase throughput. The sealing systems can also include overlapping seals, which further stop gas movement in and out of the vent stack. The overlapping seals additionally provide a moving allowance to accommodate movement of the stack lid portions (e.g., movement away from each other over time).

From the foregoing it will be appreciated that, although specific embodiments of the technology have been described herein for purposes of illustration, various modifications may be made without deviating from the spirit and scope of the technology. For example, while the sealing systems have been discussed in the context of vent stack lids, they can be used on the tops, sides, or other surfaces of any commercial, high-temperature vent stacks or other structures operating under positive or negative pressure. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:

1. A method of sealing a vent stack, the method comprising:
   providing a vent stack lid including a first lid portion and a second lid portion spaced apart from the first lid portion, such that there is a space between the first and second lid portions when the first and second lid portions are in a closed position, wherein the vent stack lid includes a first side configured to be in contact with an operation fluid and a second side opposite the first side;
   positioning a flexible, heat-resistant material at the space between the first and second lid portions; and
   positioning a rigid, heat-resistant material adjacent to the flexible material at the second side, such that, in operation, gas is inhibited from traversing the space between the first and second lid portions, wherein, when the first and second lid portions are in the closed position, the rigid material is disposed at the second side of the vent stack lid over (i) the space between the first and second lid portions, (ii) at least a portion of the first lid portion, and (iii) at least a portion of the second lid portion.

2. The method of claim 1 wherein the first lid portion comprises a top portion and a sidewall portion, and wherein positioning the flexible, heat-resistant material comprises positioning the flexible, heat-resistant material along at least one of the top portion or the sidewall portion.

3. The method of claim 1, further comprising positioning a plurality of tadpole seals in the space between the first and second lid portions.

4. The method of claim 3, further comprising overlapping the tadpole seals with at least one of the flexible, heat resistant material or the rigid, heat-resistant material.

5. The method of claim 1, wherein positioning the flexible, heat-resistant material comprises pivoting or sliding the material into the space between the first and second lid portions.

6. The method of claim 1, further comprising positioning a plurality of spring seals above the space between the first and second lid portions.

7. The method of claim 1, further comprising positioning a plurality of spring seals above the space between the first and second lid portions, such that the first spring seal and the second spring seal are laterally offset from the space between the first and second lid portions.

8. The method of claim 1, wherein the vent stack further comprises a first sealing portion coupled to the first lid portion and a second sealing portion coupled to the second lid portion, the method further comprising positioning the second sealing portion to at least partially overlap the first sealing portion over the space between the first and second lid portions.

9. The method of claim 7, wherein the second sealing portion is slidably coupled to the second lid portion.

10. The method of claim 7, wherein the second sealing portion is pivotably coupled to the second lid portion.

11. The method of claim 1, wherein the operational fluid is a flue gas.

12. The method of claim 1, wherein the vent stack lid is rigid and includes a lip, and wherein the flexible material conforms a shape of the lip.

13. A method of sealing a vent stack, the method comprising:

providing a vent stack lid including a first lid portion, a first sealing portion coupled to the first lid portion, a second lid portion, and a second sealing portion coupled to the second lid portion, wherein:
- when the vent stack is in a closed position, the second lid portion is spaced apart from the first lid portion to define a space between the first and second lid portions,
- the vent stack lid includes a first side configured to be in contact with an operation fluid and a second side, opposite the first side, exposed to atmosphere,
- the first sealing portion includes, at the second side, a first material that is flexible and a second material that is rigid, and
- when the vent stack is in the closed position, the second material at least partially overlaps (i) the space between the first and second lid portions, (ii) at least a portion of the first lid portion, and (iii) at least a portion of the second lid portion; and positioning the second sealing portion to at least partially overlap the first sealing portion over the space between the first and second lid portions.

14. The method of claim 13, wherein the first lid portion comprises a top portion and a sidewall portion, and wherein positioning the first material comprises positioning the first material along at least one of the top portion or the sidewall portion.

15. The method of claim 13, wherein positioning the first material comprises pivoting or sliding the first material into the space between the first and second lid portions.

16. The method of claim 13, further comprising positioning the second material adjacent to the first material, such that, in operation, gas is inhibited from traversing the space between the first and second lid portions.

17. The method of claim 13, further comprising positioning a plurality of tadpole seals in the space between the first and second lid portions.

18. The method of claim 13, further comprising positioning a plurality of spring seals above the space between the first and second lid portions.

19. The method of claim 13, further comprising positioning a plurality of spring seals above the space between the first and second lid portions, such that the first spring seal and the second spring seal are laterally offset from the space between the first and second lid portions.

* * * * *

UNITED STATES PATENT AND TRADEMARK OFFICE
CERTIFICATE OF CORRECTION

PATENT NO.           : 11,939,526 B2                                        Page 1 of 1
APPLICATION NO.      : 17/471491
DATED                : March 26, 2024
INVENTOR(S)          : Gary Dean West et al.

It is certified that error appears in the above-identified patent and that said Letters Patent is hereby corrected as shown below:

On the Title Page
On Page 10, Column 2 (Other Publications), Line 35, delete "Systgem" and insert --System-- therefor.

In the Specification
In Column 4 (Detailed Description), Line 5, delete "b e" and insert --be-- therefor.
In Column 6 (Detailed Description), Line 25, delete "472" and insert --432-- therefor.
In Column 6 (Detailed Description), Line 47, delete "432" and insert --332-- therefor.
In Column 7 (Detailed Description), Line 21, delete "b e" and insert --be-- therefor.

Signed and Sealed this
Twenty-ninth Day of April, 2025

Coke Morgan Stewart
*Acting Director of the United States Patent and Trademark Office*